United States Patent
Miura

(10) Patent No.: US 8,929,742 B2
(45) Date of Patent: Jan. 6, 2015

(54) OPTICAL COMMUNICATION MODULE, AND OPTICAL COMMUNICATION SYSTEM IN WHICH OPTICAL COMMUNICATION MODULE IS USED

(75) Inventor: Masayuki Miura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 334 days.

(21) Appl. No.: 13/255,755

(22) PCT Filed: Mar. 3, 2010

(86) PCT No.: PCT/JP2010/053429
§ 371 (c)(1),
(2), (4) Date: Oct. 18, 2011

(87) PCT Pub. No.: WO2010/103970
PCT Pub. Date: Sep. 16, 2010

(65) Prior Publication Data
US 2012/0039614 A1 Feb. 16, 2012

(30) Foreign Application Priority Data

Mar. 9, 2009 (JP) .................................. 2009-054736

(51) Int. Cl.
*H04B 10/00* (2013.01)
*G02B 6/42* (2006.01)

(52) U.S. Cl.
CPC .............. *H04B 10/00* (2013.01); *G02B 6/4246* (2013.01)
USPC ........... 398/135; 398/164; 398/136; 398/137; 398/138; 398/139; 398/128; 398/130; 398/33; 398/25; 398/45; 385/89; 385/90; 385/92; 385/93

(58) Field of Classification Search
USPC ......... 398/135, 136, 137, 138, 139, 164, 154, 398/155, 128, 130, 45, 33, 25; 385/89, 90, 385/92, 93
See application file for complete search history.

(56) References Cited

U.S. PATENT DOCUMENTS

| | | |
|---|---|---|
| 7,050,720 B2 | 5/2006 | Aronson et al. |
| 7,809,275 B2 | 10/2010 | Aronson et al. |
| 2008/0225882 A1 | 9/2008 | Atsumi et al. |

FOREIGN PATENT DOCUMENTS

| | | |
|---|---|---|
| CN | 101185247 | 5/2008 |
| CN | 101267276 | 9/2008 |
| CN | 101281473 A | 10/2008 |
| JP | 2004-523958 | 8/2004 |
| JP | 2006/101435 | 4/2006 |
| JP | 2007-500458 A | 1/2007 |
| JP | 2008-533822 | 8/2008 |
| JP | 2008-227993 | 9/2008 |
| JP | 2009-130684 A | 6/2009 |

OTHER PUBLICATIONS

INF-8074i Specification for SFP (Small Form Factor Pluggable) Transceiver, Rev 1.0, May 12, 2001, SFF Committee, 38 pages.

(Continued)

*Primary Examiner* — Hanh Phan
(74) *Attorney, Agent, or Firm* — Baker & Hostetler LLP

(57) ABSTRACT

An optical communication module in which the pin arrangement can be applied flexibly. An optical communication module has an outer shape formed based on normal standards and which is able to communicate with a host-side circuit board, etc. to which it is fitted, via a predetermined communication interface; wherein the optical communication module exchanges input/output I/F information with the circuit board, etc., and the communication interface can be switched to another communication interface based on these input/output I/F information.

15 Claims, 9 Drawing Sheets

(56) References Cited

OTHER PUBLICATIONS

International Patent Application No. PCT/JP2010/053429: International Search Report and Written Opinion dated May 18, 2010, 13 pages (with English Translation).

Chinese Patent Application No. 2010-80009900.2: Office Action dated Nov. 25, 2013, 14 pages.

Japanese Patent Application No. 2011-503781: Office Action dated Nov. 25, 2013, 5 pages.

Japanese Patent Application No. 2011-503781: Decision to Grant dated Apr. 22, 2014, 4 pages.

China Application No. 201080009900.2; Office Action; dated Aug. 6, 2014; 18 pages.

OPTICAL COMMUNICATION MODULE, AND OPTICAL COMMUNICATION SYSTEM IN WHICH OPTICAL COMMUNICATION MODULE IS USED

CROSS-REFERENCE TO RELATED APPLICATIONS

This application is the National Stage of International Application No. PCT/JP2010/053429, filed Mar. 3, 2010, which claims the benefit of Japanese Patent Application No. 2009-054736, filed Mar. 9, 2009, the disclosure of which is incorporated herein by reference in its entirety.

TECHNICAL FIELD

The present invention relates to an optical communication module that can be fitted to a circuit board or the like and that can communicate with the circuit board based on a communication interface, and an optical communication system in which this optical communication module is used.

BACKGROUND ART

Conventionally, optical communication modules used in optical communication in order to, respectively, convert light into electricity or electricity into light are known. In such an optical communication module, the outer dimensions of the product and the input/output interface (pin arrangement, electric characteristics; hereinafter called "input/output I/F") are prescribed (see, e.g., Non-Patent Document 1) according to normal standards (SFP transceiver specifications) in order to build a stable provision system and to pursue user convenience.

Furthermore, peripheral devices (e.g., shield components, connector plugs) for use of the optical communication module are also standardized, so that an environment is provided that can easily be used as product platform for the optical communication module.

Now, for example, the input/output I/F will be examined. As shown in FIG. 11, as to the pin arrangement, the allocation of the 20 pins, i.e. what each pin is connected to (e.g., power supply, ground, communication, etc.), is strictly defined.

PRIOR ART DOCUMENT

Non-Patent Document:
 Non-Patent Document 1: INF-8074i Specification for SFP (Small Form Factor Pluggable) Transceiver, Rev.1.0, May 12, 2001, SFF Committee

SUMMARY OF THE INVENTION

Problem to be solved by the Invention

1) Flexibility of Adaptation
 The input/output I/F is clearly defined by the above-mentioned standards. However, in case these standards are to be applied to optical communication modules intended for use not conceived when the standards are normalized (e.g., in case a peculiar input/output I/F must be implemented), the pin arrangement also deviates from the standards, so that adaptation to optical communication is impossible. In such cases, adaptation has to be realized with a new product platform. Therefore, the cost advantages achieved by using an already existing product platform (cost saving achieved by commonizing peripheral devices to obtain the mass-production effect, etc.) are lost.

2) Adaptability to the Latest I/F
 For the same reason as given above under item 1), adaptation is also impossible when a new input/output I/F is introduced. Therefore, the benefits arising from the development of new technologies (reduction of electric power consumption, compatibility with high-speed transmission, etc. due to new technologies) and the cost advantages due to the mass-production effect achieved by using input/output I/Fs popular at the time, cannot be achieved.

3) Increase in Electric Power Consumption of Unused I/Fs
 For the same reason as given above under item 1), end terminals based on normal standards are also necessary for I/Fs that are not used in products with certain purposes. Therefore, electric power consumption increases by the amount for the unused I/Fs.

The object of the present invention is to provide an optical communication module in which the pin arrangement can be applied flexibly, and an optical communication system in which this optical communication module is used.

Means for Solving the Problem

In order to solve the above problem, the present invention is characterized in that it has an outer shape formed based on the normal standards and which is able to communicate with a host-side circuit board, etc. to which the optical module is fitted, via a predetermined communication interface, wherein the optical module exchanges input/output I/F information with the circuit board, etc. and is able to switch the communication interface to another communication interface based on the input/output I/F information.

The optical communication module may also be configured so that the input/output I/F between the optical communication module and the circuit board, etc. is activated with a predetermined communication interface, upon turning on a power supply or upon initialization.

Moreover, it is preferable that the optical communication module comprises an input/output I/F information storage block that stores input/output I/F information and feeds the input/output I/F information to the side of the circuit board, etc., and an input/output I/F setting storage block that stores input/output I/F setting information which are determined based on information of the input/output I/F information storage block and transmitted from the side of the circuit board, etc.

In such a case, it is also possible to provide an input/output I/F control block that sets the input/output I/F for each terminal based on the information of the input/output I/F setting storage block.

Furthermore, the optical communication module may be configured so that information about the product type name originally owned by the optical communication module is obtained from within product information contained in the information communicated between the optical communication module and the circuit board, etc., and the input/output I/F is thus specified.

By doing so, it becomes possible to realize quick changes in the input/output I/F.

The optical communication module may also be configured to comprise an input/output I/F information storage block that stores input/output I/F information; an input/output I/F information comparison and judgment part that compares the input/output I/F information obtained from the circuit board, etc. side and the input/output I/F information storage block input/output information of the input/output I/F information storage block, and judges whether or not they coincide; and an input/output I/F setting storage part that, based on the judgment by the input/output I/F information comparison and judgment part, transmits the input/output I/F setting information to the side of the circuit board, etc.

Moreover, the optical communication module may also be configured so that it comprises an input/output I/F information storage block that stores the input/output I/F information; an input/output I/F information comparison and judgment part that compares the input/output I/F information obtained from the side of the circuit board, etc. and the input/output I/F information storage block input/output information of the input/output I/F information storage block, and judges whether or not they coincide; and an input/output I/F setting storage part that, based on the judgment by the input/output I/F information comparison and judgment part, stores the input/output I/F setting information.

In such a case, the optical communication module may be provided with an input/output I/F control block that sets the input/output I/F for each terminal based on the information of the input/output I/F setting storage part.

On the other hand, the present invention is characterized in that it comprises an optical communication system comprising an optical communication module which has an outer shape formed based on standard specifications, and a circuit board, etc. on the host side to which the optical communication module is fitted, said optical communication module and said circuit board, etc. being able to communicate via a predetermined communication interface, wherein input/output I/F information are exchanged between the circuit board, etc. and the optical communication module, and it is possible to switch to another communication interface based on the input/output I/F information.

This optical communication system may be configured so that the input/output I/F between the circuit board, etc. and the optical communication module is activated with the predetermined communication interface, upon turning on a power supply or upon initialization.

In such a case, it is preferable that at least one of the following functions is implemented:
- In the optical communication module, acquiring input/output I/F information of the circuit board, etc. from the optical communication module, or
- In the circuit board, etc., acquiring the input/output I/F information of the optical communication module from the circuit board, etc.

Furthermore, in this optical communication system, in a case where one input/output I/F of the optical communication module or the circuit board, etc. corresponds to a plurality of input/output I/Fs, one input/output I/F out of the plurality of input/output I/Fs can be selected and made to operate.

Moreover, the optical communication system may also be configured so that, in case there are a plurality of coinciding input/output I/Fs, it is possible to intermittently switch the input/output I/F.

Advantageous Effects of Invention

With the optical communication module and the optical communication system wherein the optical communication module is used, according to the present invention, the following advantageous effects can be achieved.

(1) Since the input/output I/F information is exchanged with the circuit board, etc. and switching to another communication terminal can be achieved based on the input/output I/F information, the input/output I/F of the module can be adapted flexibly to the circuit board, etc. Therefore, no electric damage is caused to the circuit board, etc. that is in compliance with the existing normal standards.

(2) Since the invention possesses the outer shape formed based on the normal standards, the cost advantages achieved by using an already existing product platform (cost saving achieved by commonizing the peripheral devices to obtain the mass-production effect) are not lost.

(3) In case an I/F newer than the existing I/F is introduced, [the invention] can be adapted flexibly to this new I/F. Therefore, it becomes possible to reduce the electric power consumption by inserting an I/F with excellent power consumption as the new I/F. Furthermore, it is possible to convert the low power consumption by changing the input/output I/F by, e.g., setting unused input/output I/Fs to OPEN.

EMBODIMENTS

In the following, as an example for Embodiments 1 to 3, the case is described where the invention is applied to a SFP optical transceiver standardized by the SFF Committee as explained above in connection with the prior art (Non-Patent Document 1).

First Embodiment

Hereinafter, an optical communication module according to the first embodiment of the present invention is described by referring to FIGS. 1-3.

Figure 1:
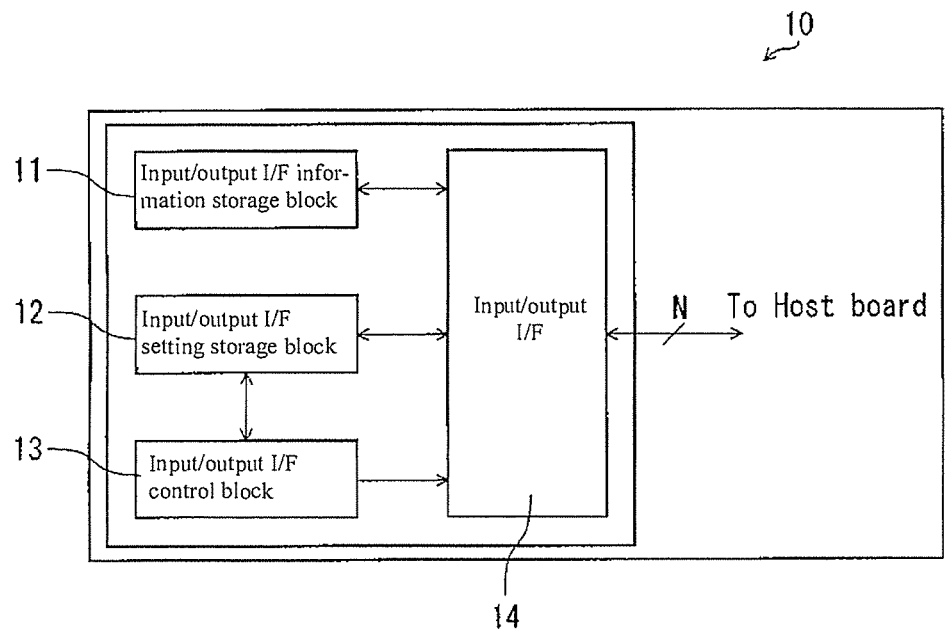
FIG. 1 is a block diagram showing the configuration of a module according to a first embodiment of the present invention.

FIG. 1 is a block diagram showing the configuration of a SFP optical transceiver (optical communication module; hereinafter referred to as "module 10") used for the present invention.

In addition to the usual configuration, the module 10 is provided with an input/output interface (I/F) information storage block 11, an input/output I/F setting storage block 12, and an input/output I/F control block 13, as shown in FIG. 1.

Figure 11:
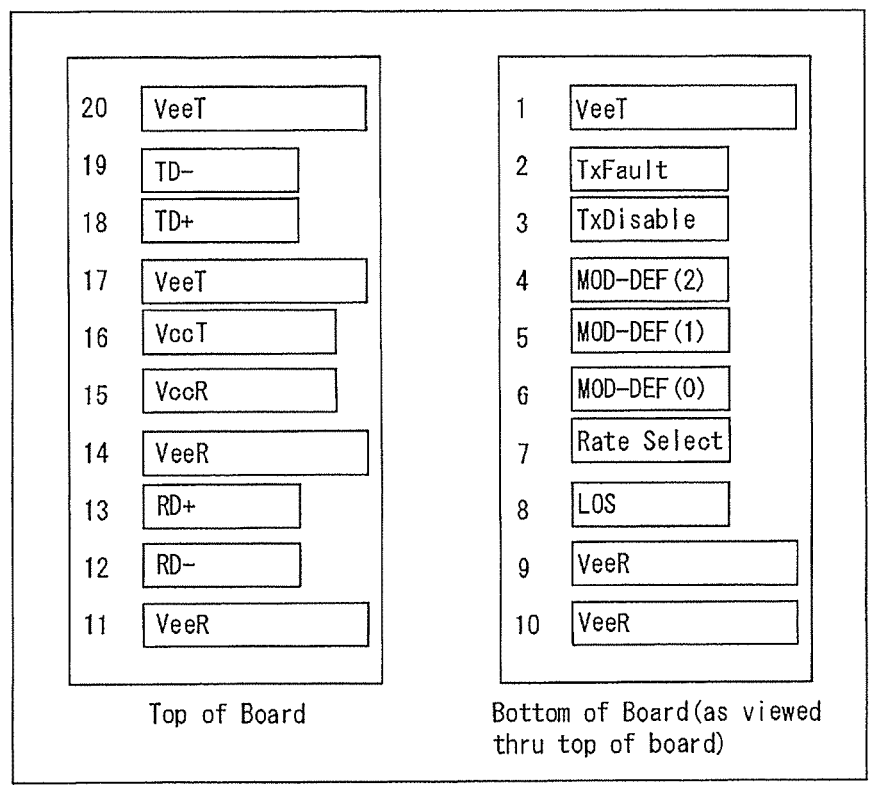
FIG. 11 is a drawing showing a pin arrangement as specified by the normal standards for SFP transceivers.

Furthermore, the module 10 is provided with an input/output I/F 14 for carrying out the input/output with a host board (circuit board, etc.; hereinafter referred to as host 20) to which the SFP optical transceiver is mounted. The input/output I/F 14 consists of pins whose number is specified by the standards. In the present embodiment, it consists of 20 pins (see FIG. 11) that correspond to the specifications of the SFP transceiver. The input/output I/F 14 is configured so that it can at least exchange information with the input/output I/F 24 of the host 20 in FIG. 2 based on the request from the host 20 via an I2C interface specified in the SFP standards. Furthermore, the input/output I/F 14 is configured so that necessary changes in the pin setting can be performed by the input/output I/F control block 13 which is described in detail below.

The input/output I/F information storage block 11 serves storing input/output I/F information (e.g., the input/output (I/O) information of all input/output I/Fs, the logic level (e.g., LVTTL/CML), information regarding the functions of the pins (e.g., RESET), etc.) which can be set by the module 10. Concretely, according to the standards, the pin No. 7 is a terminal for inputting thereto information regarding the transmission speed of the data. However, besides inputting the information regarding the transmission speed of the data, the pin No. 7 may also input a reset signal, outputs an alarm for the current or temperature of a light emitting component (laser, etc.), and stores information that allow a temperature control signal for changing the desired control temperature of the light emitting component, to be inputted. The input/output I/F information storage block 11 is configured so that it can perform mutual transmission and reception of signals between the above block 11 itself and the input/output I/F 14. More in detail, the input/output I/F 14 is not connected to all the pins, but rather only to the terminals (e.g., in a I2C interface only pin No. 4 and pin No. 5 (+GND pins)) that can exchange the information with the host 20. Thus, the transmission and reception of signals is performed. The input/output I/F information storage block 11 is e.g. an EEPROM.

The input/output I/F information storage block 11 of the present embodiment possesses, within the information regarding settable input/output I/Fs, information regarding a normal input/output I/F and information regarding a plurality of non-standard input/output I/Fs, such as those for the above-mentioned current alarm and the temperature alarm, etc.

The input/output I/F setting storage block 12 stores setting information for the input/output I/F of the module 10. The input/output I/F setting storage block 12 is configured so that it can perform mutual transmission and reception of signals between the above block itself and the input/output I/F 14. More in detail, the input/output I/F 14 is not connected to all of the pins, but rather only to the terminals (e.g., only the pin No. 4 and the pin No. 5 (+GND pins) in an I2C interface) that can exchange the information with the host 20. Thus, the transmission and reception of signals is performed. In this manner, writing (e.g. writing for adapting to a non-standard input/output I/F) can be set in accordance with the request from the host 20 via the input/output I/Fs 14 and 24. The input/output I/F setting storage block 12 is, e.g., an EEPROM.

When this writing setting is finished, the change of the input/output I/F can also be completed.

The input/output I/F control block 13 is configured so that it can perform transmission and reception of signals between the above block 13 itself and the input/output I/F setting storage block 12, and sets the input/output I/F 14 based on the information read from the input/output I/F setting storage block 12. As to the connection between this input/output I/F control block 13 and the input/output I/F 14, it is sufficient if only the pins for which the setting is changeable are connected by control lines. The input/output I/F control block 13 is, e.g., a mechanical switch. It may also possess a function of switching electrically or through software. Concretely, according to the standards, the pin No. 7 is a terminal for outputting information regarding the transfer speed of the data. However, in case the pin No. 7 not only outputs the information regarding the transfer speed of the data, but inputs a reset signal, outputs an alarm for the current or the temperature (laser, etc.), and stores the information that can input thereto a temperature control signal for changing the desired control temperature of the light emitting component, it becomes possible to change the input/output I/F for the pin No. 7 by means of the input/output I/F control block 13 based on the information regarding the determined input/output I/F.

Furthermore, the input/output I/F control block 13 has a configuration corresponding to a normal I/F (predetermined communication interface), and is set to communicate through the normal I/F when activated. In case the module 10 has been given a request by the host 20 for a write setting for corresponding to a different non-standard input/output I/F, the normal I/F is switched to the requested non-standard I/F.

Incidentally, in case the module 10 does not correspond to the non-standard input/output I/F, it remains set to the normal I/F.

Figure 2:
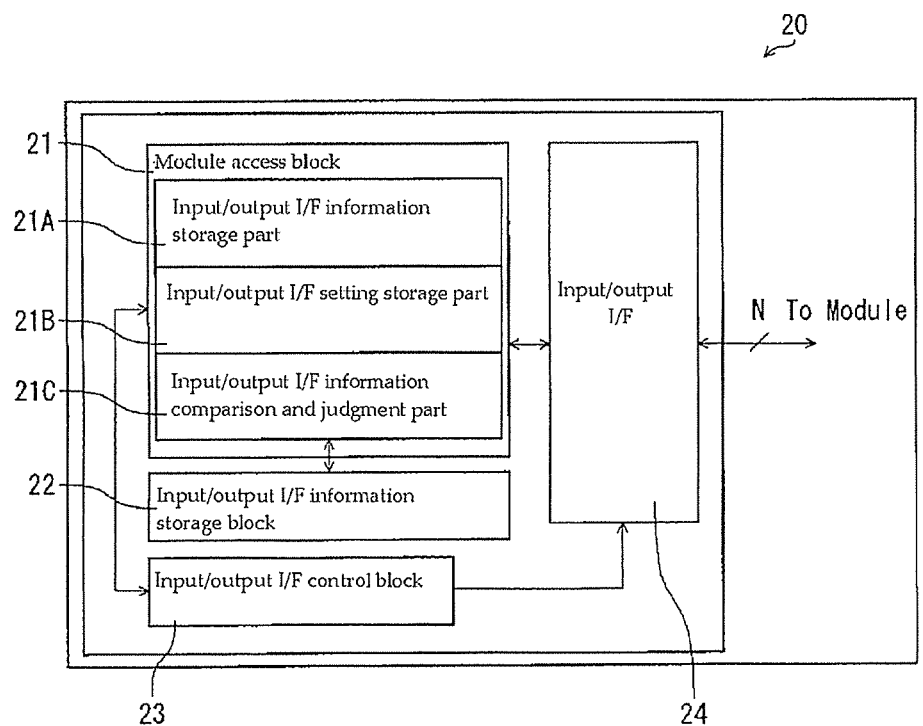
FIG. 2 is a block diagram showing the configuration of a host board to which the module according to the first embodiment of the present invention is mounted.

FIG. 2 is a block diagram showing the configuration of the host 20.

In addition to the usual configuration, the host 20 is provided with a module access block 21, an input/output I/F information storage block 22, and an input/output I/F control block 23, as shown in FIG. 2. Furthermore, the host 20 is provided with an input/output I/F 24 for carrying out the input/output operation with the module 10.

The module access block 21 comprises an input/output I/F information storage part 21A, an input/output I/F setting storage part 21B, and an input/output I/F information comparison and judgment part 21C. Furthermore, the module access block 21 is configured so that it can perform the transmission and reception of signals between the above block 21 itself and the input/output I/F 24. More in detail, the input/output I/F 24 is not connected to all the pins, but rather only to the terminals (e.g., in an I2C interface, only the pin No. 4 and the pin No. 5 (+GND pins)) that enable the exchange of information with the module 10. Thus, the transmission and reception of signals is performed.

The input/output I/F information storage part 21A possesses a function of accessing the input/output I/F information storage block 11 of the module 10 and reading the information regarding the settable input/output I/Fs of the module 10.

The input/output I/F information comparison and judgment part 21C compares the input/output I/F information read from the module 10 with the input/output I/F information held by the host 20, and judges whether the input/output I/F 24 of the host 20 coincides with the input/output I/F 14 of the module 10.

The input/output I/F setting storage part 21B possesses a function of, based on the results of the comparison and judgment function of the input/output I/F information comparison and judgment part 21C, writing information regarding which input/output I/F is effectively set in the input/output I/F setting storage block 12 of the module 10. In such a case, if they coincide, it is effectively set (stored), but if they do not coincide, it is not set (communication is carried out with the normal I/F setting maintained).

The input/output I/F information storage block 22 stores input/output I/F information (e.g., the input/output (I/O) information of the respective input/output I/Fs, the logic level (e.g., LVTTL/CML), information regarding the functions of the pins (e.g., RESET), etc.) of the input/output I/F 24 of the host 20. The input/output I/F information storage block 21 is configured so that it can perform the transmission and reception of signals between the above block 21 itself and the input/output I/F information comparison and judgment part 21C. The input/output I/F information storage block 22 is e.g. an EEPROM.

The input/output I/F control block 23 is configured so that it can perform the transmission and reception of signals between the module access block 21 and the input/output I/F 24. Thanks to this configuration, the host 20 can set the input/output I/F 24 based on the information of the input/output I/F setting storage part 21B inside the host 20. As to the connection between this input/output I/F control block 23 and the input/output I/F 24, it is sufficient if only the pins for which the setting is changeable are connected by the control lines. The input/output I/F control block 23 is, e.g., a mechanical switch. It may also possess a function of switching electrically or through software.

Furthermore, the input/output I/F control block 23 has a mechanism corresponding to a standard I/F, and is set to communicate through the normal I/F when activated or initialized. In case the host 20 requests write setting for adapting to another non-standard input/output I/F to the module 10, the host 20 side is switched to a corresponding I/F, and the module 10 is also switched from the normal I/F to the requested non-standard I/F.

Incidentally, in case the module 10 does not correspond to the non-standard input/output I/F, it remains set to the normal I/F.

The input/output I/F 24 is configured so that reading can be performed between the input/output I/F 24 itself and the input/output I/F 14 of the module 10 via an I2C interface specified in the SFP standards.

The above-described module 10 and host 20 have outer shapes determined by the normal standards. These standards are determined, e.g., by the specifications of the SFP transceiver, and each of the module 10 and the host 20 is configured so that it is detachable with compatibility.

Furthermore, although the connection between the module 10 and the host 20 takes the form of being implemented as a connector, and the form of being mounted on the top of a substrate, etc., it is not limited to any of these connection forms, and is configured to have compatibility according to the standards.

Figure 3:
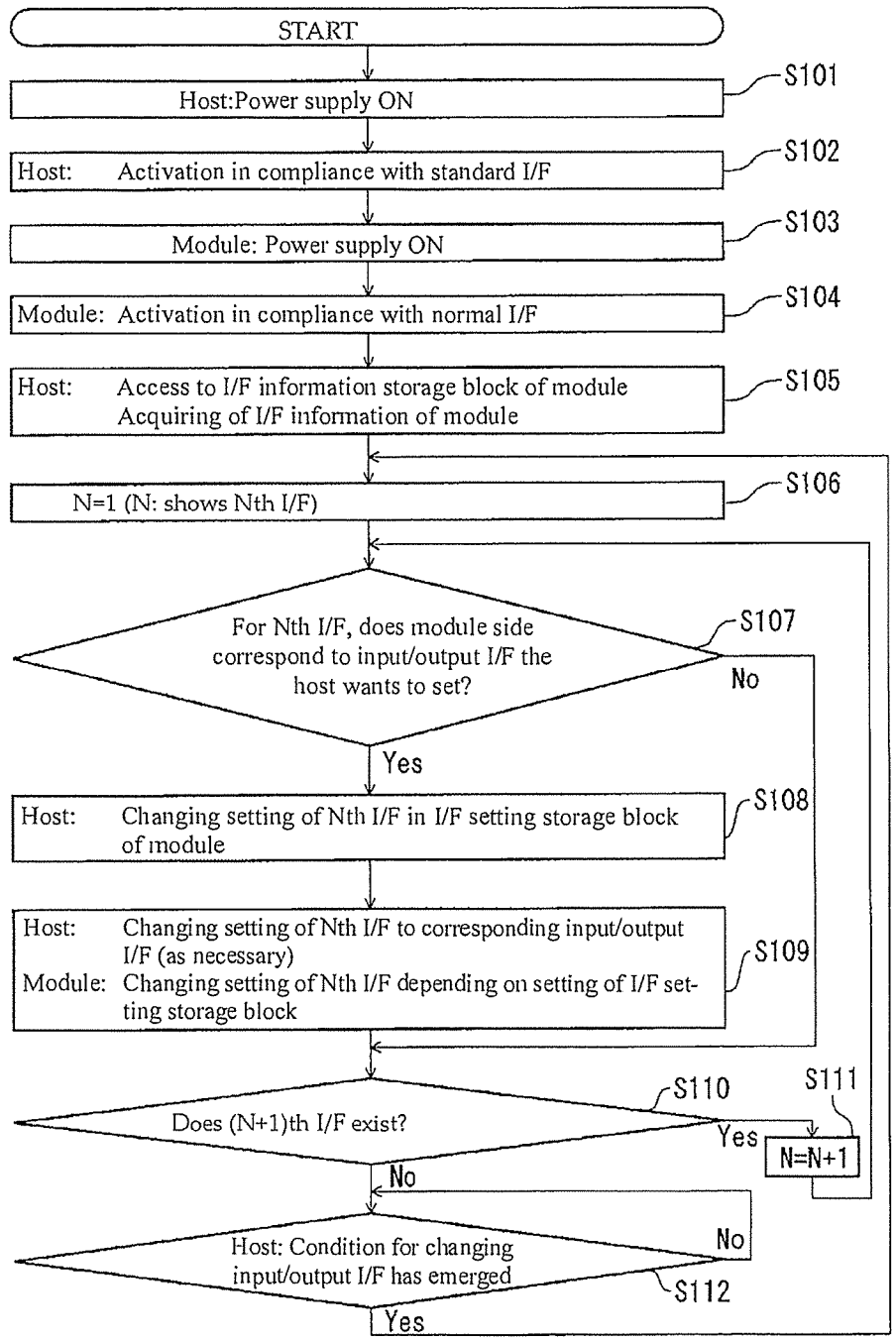
FIG. 3 is a flowchart showing the operation of the first module and the host according to the first embodiment.

FIG. 3 is a flowchart showing the operation of the module 10 and the host 20.

The module 10 and the host 20 possessing the above-described functions carry out the steps 101 to 112 based on the function of each block.

When electric power is fed to the host 20 (S101), the host 20 is activated in a condition where it is in compliance with the normal I/F (S102). Next, when electric power is fed to the module 10 (S103), the module 10 is also initially activated in a condition where it is in compliance with the normal I/F (S104). Because of this, the input/output I/Fs 14, 24 of the module 10 and the host 20 are initially set to the normal input/output I/F stored as an initial condition in the input/output I/F setting storage blocks 12, 22, and communicate with each other based on the I2C interface.

Now, the above-mentioned "compliance" means that, if they conform electrically, it is not absolutely necessary to implement a function of the standard I/F, and it is sufficient if, with the I2C communication standards, the host 20 can read the input/output I/F information of the module 10 and can perform minimum communication necessary for setting the module 10. Concretely, this means that the pin allocations indispensable for communication, such as power supply, communication signal, etc., conform to the I2C communication specifications, and that the other unused pins do not have to conform to them. Incidentally, although in the present embodiment, the exchange of input/output I/F information is performed using an I2C interface, it is not limited to the I2C interface. As long as the interface enables the exchange of input/output I/F information, any kind of interface is applicable.

Next, the input/output I/F information storage part 21A of the host 20 accesses the input/output I/F information storage block 11 of the module 10 and acquires I/F information of the module 10 (S105). This I/F information includes I/F information corresponding to each pin, information about whether or not the module 10 implements another non-standard I/F other than the normal I/F.

Subsequently, the module access block 21 of the host 20 counts the I/F information for the 1st to Nth (in the present embodiment, N is 1 to 20) pin out of the plurality of pins in order to check and scan them (S106). First, for the I/F of the first pin, the input/output I/F information comparison and judgment part 21C of the host 20 judges whether the module 10 corresponds to the input/output I/F the host 20 wants to set (S107). For example, if the I/F of the Nth pin corresponds to the I/F the host 20 wants to set, the input/output I/F setting storage part 21B of the host 20 writes this I/F for the Nth pin into the input/output I/F setting storage block 12 of the module 10, and changes the setting (S108).

Then, the input/output I/F control block 23 of the host 20 changes the I/F setting for the input/output I/F 24 as necessary, while the input/output I/F control block 13 of the module 10 changes the setting of the I/F of the Nth pin for the input/output I/F 14 depending on the setting of the input/output I/F setting storage block 12 (S109). On the other hand, if the I/F in step 107 is not the I/F the host 20 wants to set, the steps 108 and 109 are not carried out.

Then, it is judged whether or not there is a (N+1)th pin (S110), and if such a pin exists, 1 is added to N (S111) and the operation returns to the step 107 and is executed again. If there is no (N+1)th pin, the change of the I/F to the Nth input/output I/F becomes final. In this manner, based on the acquired input/output I/F information, the mutually corresponding input/output I/Fs of the host 20 and the module 10 are checked and the optimum input/output I/F is set for each I/F as necessary. For example, in case the host 20 and the module 10 correspond to the same non-standard input/output I/F, it is possible to set them to the non-standard input/output I/F.

Then, the input/output I/F control block 23 of the host 20 judges whether or not a condition has emerged where the input/output I/F should be changed (S112), and, if such a condition has not emerged, it executes the step 112 until it is confirmed that such a condition has emerged.

The judgment regarding whether or not said condition has emerged may be carried out intermittently as necessary. In other words, one communication and another communication do not need to be carried out by the same input/output I/F. Rather, the optimum input/output I/F may be selected for each communication (e.g., energy-saving communications and normal communications are separately used), and the input/output I/F may be changed intermittently.

Furthermore, in case the pins up to the Nth pin are judged and the I/F which the host 20 wants to set is not found, or in case there is no adaptable I/F, the module 10 and the host 20 send and receive signals through the initial normal I/F.

The optical communication module 10 according to the first embodiment of the present invention is able to communicate with the host 20 to which it is fitted, via a normal communication interface, exchanges input/output I/F information with the host 20, and can switch to another communication interface based on these input/output I/F information. Thus, it is possible to flexibly adapt the input/output I/F of the module 10 to the host 20. Therefore, no electrical damage is caused to the host 20 that is in compliance with the existing normal standards.

Furthermore, since the module 10 and the host 20 have outer shapes formed based on the normal standards, the cost advantages achieved by using an existing product platform (cost saving, etc. achieved by communizing peripheral devices to obtain the mass-production effect.) are not lost.

Moreover, in case an I/F newer than the existing I/F is introduced, the invention can be adapted flexibly to this new I/F. Therefore, it becomes possible to reduce electric power consumption by using an I/F with excellent power consumption as the new I/F. Furthermore, it is possible to lower power consumption by changing the input/output I/F by e.g. setting unused input/output I/Fs to OPEN.

Furthermore, the optical communication module 10 is configured so that upon turning on the power supply or upon initialization, the input/output I/F between the module 10 itself and the host 20 is activated with a normal communication interface. Therefore, the I/F information can be exchanged under the initial condition through said normal communication interface.

Furthermore, since the optical communication module 10 comprises an input/output I/F information storage block 11 that stores input/output I/F information and feeds the input/output I/F information to the host 20, and an input/output I/F setting storage block 12 that stores the input/output I/F determined based on the information of the input/output I/F information storage block 11 and sent from the host 20, the input/output I/F of the module 10 can be flexibly adapted to the host 20. Therefore, no electrical damage is caused to the host 20 that is in compliance with the existing normal standards.

On the other hand, in the optical communication system according to the first embodiment of the present invention which comprises the optical communication module 10 with the outer shape formed based on the normal standards, and the host 20 to which the optical communication module 10 is fitted; and the optical communication module 10 and the host 20 are able to communicate via the normal communication interface, the input/output I/F information is exchanged between the host 20 and the module 10, and it is possible to switch to another communication interface based on the input/output I/F information. Thus, it is possible to flexibly adapt the input/output I/F of the module 10 to the host 20. Therefore, no electrical damage is caused to the host 20 that is in compliance with the existing normal standards. Furthermore, since the invention possesses the outer shape formed based on the normal standards, the cost advantages achieved by using the existing product platform (cost saving, etc. achieved by communizing peripheral devices to obtain the mass-production effect) are not lost. Moreover, in case an I/F newer than the existing I/F is introduced, the invention can be adapted flexibly to this new I/F. Therefore, it becomes possible to reduce electric power consumption by using an I/F with excellent power consumption as the new I/F. Furthermore, it is possible to lower power consumption by changing the input/output I/F by e.g. setting unused input/output I/Fs to OPEN.

Since the optical communication system is configured so that, upon turning on the power supply or upon initialization, the input/output I/F between the host 20 and the module 10 is activated with the normal communication interface. Therefore, the I/F information can be exchanged under the initial condition through said normal communication interface.

The first embodiment of the present invention has been described so far. However, this invention is not limited to the above embodiment. Based on the technical idea of the present invention, various kinds of variations and modifications are possible.

For example, in the operation of the present embodiment, the input/output I/F setting changes are performed after the 1st to the Nth I/Fs for all the I/Fs have been checked one after another. Meanwhile, it is also possible to selectively check specific input/output I/Fs individually and then change the input/output I/F setting.

Furthermore, in an SFT transceiver, it is possible to exchange information of the product name originally owned by the SFP module by using an I2C interface or the like (or by transmitting product information of the module 10 by using one out of the 20 pins). Therefore, the input/output I/F may be specified by using the information of the original product name of the SFP module as information at the time of the comparison and judgment of the input/output I/F, and the setting of the input/output I/F can be changed. In such a case, the input/output I/F information storage block 11 of the module 10 shown in FIG. 1 is rendered unnecessary.

Figure 4:
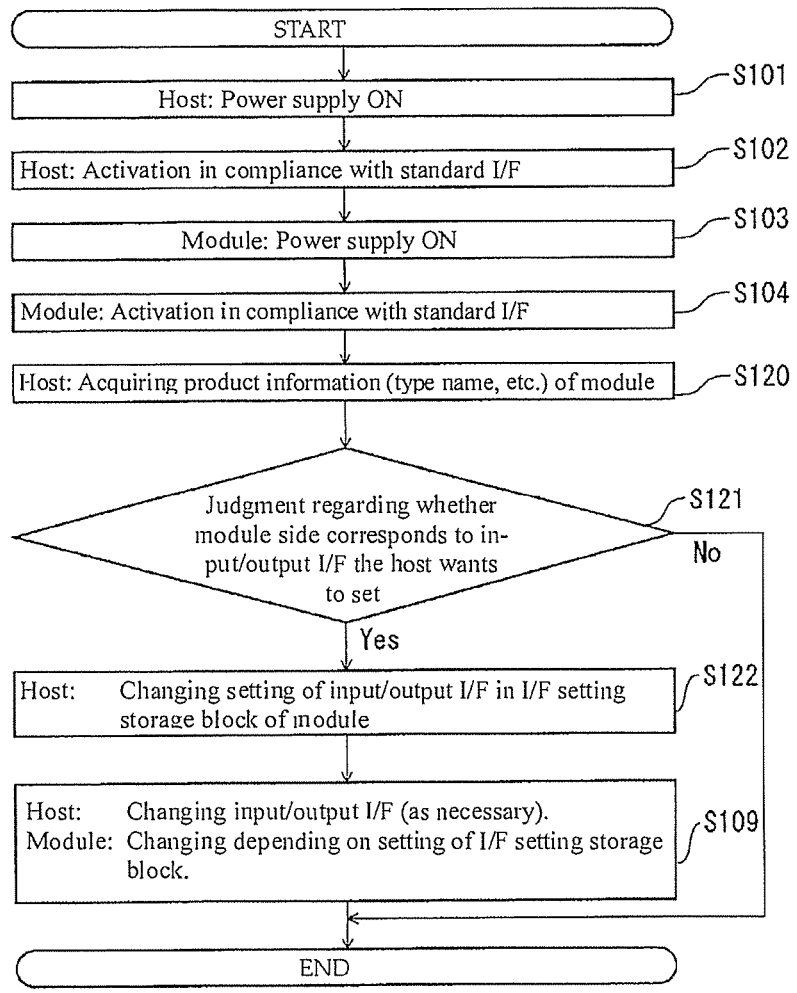
FIG. 4 is a flowchart showing a variation of the first embodiment.

The operation at this time is shown in the flowchart of FIG. 4.

In case the operation is performed according to this variation, first, the steps 101 to 104 are performed in the same manner as in the first embodiment, and the module 10 and the host 20 are able to transmit and receive signals via the normal I/F.

Next, the input/output I/F information storage part 21A of the host 20 acquires from the module 10 any obtainable product information of the module 10 by transmission and reception through the normal I/F (S120). Then, the input/output I/F information comparison and judgment part 21C of the host 20 judges whether or not the module 10 corresponds to the input/output I/F the host 20 wants to set (S121). In case they correspond, the input/output I/F setting storage part 21B of the host 20 writes the input/output I/F into the input/output I/F setting storage block 12 of the module 10, and changes the setting (S122). Then, the input/output I/F control block 23 of the host 20 and the input/output I/F control block 13 of the module 10 change the respective input/output I/Fs 14, 24, in the same manner as in the operation of the first embodiment, in accordance with the corresponding I/F (S109).

Furthermore, in case it is judged in the step 121 that there is no corresponding I/F, the step 122 and the step 109 are not performed, and the module 10 and the host 20 transmit and receive signals via the initial normal I/F. Alternatively, it is also possible to refrain from communicating in case no I/F desired to be set is found.

On the other hand, in a certain case, the input/output I/Fs of the module 10 and the host 20 each correspond to multiple types of input/output I/Fs. In such a case, the optimum input/output I/F may be selected among them. Here, an input/output I/F with a plurality of functions may be implemented in a single input/output I/F, or a plurality of input/output I/Fs may be implemented for the same function. Furthermore, both of these cases can be realized at the same time. In case a plurality of input/output I/Fs is implemented for the same function, it is conceivable that, e.g., only if both the host 20 and the module 10 correspond to each other, switching to a low-energy consumption input/output I/F takes place in accordance with the normal standards.

Moreover, the operation procedure shown in FIG. 3 may also be performed multiple times depending on the operational status of the host 20 and the module 10. Since at this time, the information exchange of the steps 101 to 105 has already been performed, these steps may be omitted in the second and the subsequent performances of the multiple-time performances as necessary. Thus, the time of the communication processing can be shortened.

Second Embodiment

Hereinafter, an optical communication module according to the second embodiment of the present invention is described by referring to FIGS. 5 to 7.

In this second embodiment, the functions of the host 20 and the module 10 of the first embodiment have been replaced. In other words, information of the host 120 are read from the module 110, and the host 120 is applied to an I/F to which the module 110 can be adapted.

Figure 5:
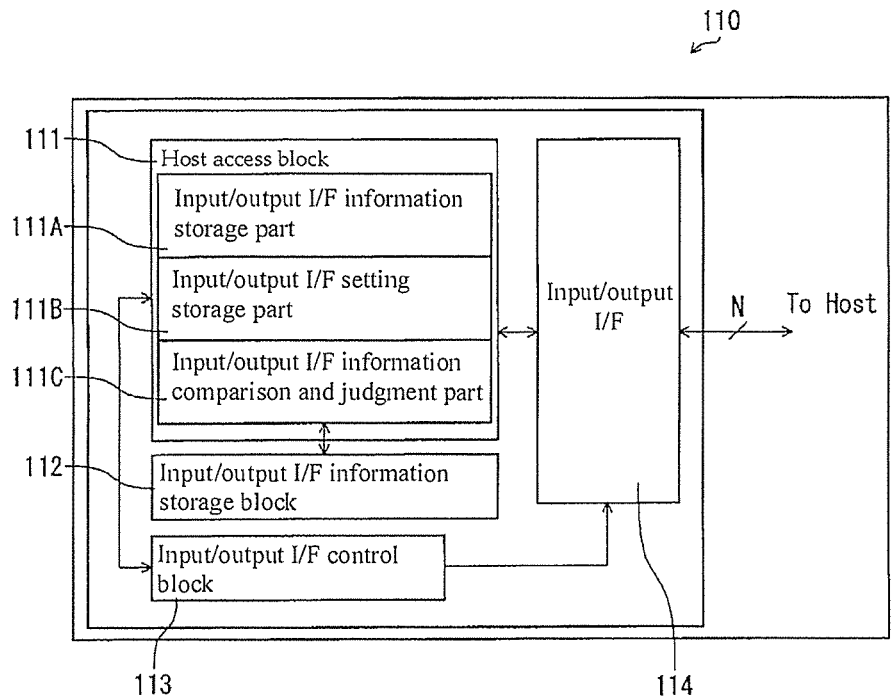
FIG. 5 is a block diagram showing the configuration of a module according to a second embodiment of the present invention.

FIG. 5 is a block diagram showing the configuration of the module 110 used in the present invention. FIG. 6 is a block diagram showing the configuration of the host 120.

In addition to the usual configuration, the module 110 is provided with a host access block 111, an input/output I/F information storage block 112, and an input/output I/F control block 113, as shown in FIG. 5. Furthermore, the module 110 is provided with an input/output I/F 114 for carrying out the input/output operation with the host board (circuit board, etc.; hereinafter referred to as host 120) to which the SFP optical transceiver is mounted.

The host access block 111 consists of an input/output I/F information storage part 111A, an input/output I/F setting storage part 111B, and an input/output I/F information comparison and judgment part 111C. Furthermore, the host access block 111 is configured so that it can perform the transmission and reception of signals between the above block 111 itself and the input/output I/F 114. More in detail, the input/output I/F 114 is not connected to all the pins, but only to the terminals (e.g., in an I2C interface, only the pin No. 4 and the pin No. 5 (+GND pins)) that enable the exchange of information with the host 110. Thus, the transmission and reception of signals is performed.

The input/output I/F information storage part 111A possesses a function of accessing the input/output I/F information storage block 121 of the host 120 and reading information regarding the settable input/output I/Fs of the host 120.

The input/output I/F information comparison and judgment part 111C compares the input/output I/F information read (obtained) from the host 120 with the input/output I/F information held by the module 110, and judges whether or not the input/output I/F 114 of the module 110 coincides with the input/output I/F 124 of the host 120.

The input/output I/F setting storage part 111B possesses a function of writing information regarding which input/output I/F is effectively set, into the input/output I/F setting storage block 122 of the host 120, based on the results of the comparison and judgment function of the input/output I/F information comparison and judgment part 111C. In such a case, if they coincide, the input/output I/F is effectively set, but if they do not coincide, it is not set.

The input/output I/F information storage block 112 stores the information (e.g., the input/output information of each input/output I/F, the logic level (e.g., LVTTL/CML), information regarding the functions of the pins (e.g., RESET), etc.) of the input/output I/F 114 of the module 110. The input/output I/F information storage block 112 is configured so that it can perform the transmission and reception of signals between the above block 112 itself and the input/output I/F information comparison and judgment part 111C. The input/output I/F information storage block 112 is, e.g., an EEPROM.

The input/output I/F control block 113 is configured so that it can perform transmission and reception of signals between the host access block 111 and the input/output I/F 114. The input/output I/F control block 113 allows the module 110 to set the input/output I/F 114 based on the information of the input/output I/F setting storage part 111B inside the module 110. As to the connection between this input/output I/F control block 113 and the input/output I/F 114, it is sufficient if only the pins for which the setting is changeable are connected by the control lines. The input/output I/F control block 113 is, e.g., a mechanical switch. It may also possess a function of switching electrically or through software.

Furthermore, the input/output I/F control block 113 has a structure corresponding to a normal I/F, and is set to communicate through the normal I/F when activated or initialized. In case the module 110 makes a request for write setting for adapting to a different non-standard input/output I/F to the host 120, the module 110 is switched to an I/F it corresponds to, and the host 120 is also switched from the normal I/F to the requested non-standard I/F.

Incidentally, in case the host 120 does not correspond to the non-standard input/output I/F, it remains set to the normal I/F.

The input/output I/F 114 is configured so that reading between the input/output IF 114 itself and the input/output I/F 124 of the host 120 via an I2C interface specified in the SFP standards is possible.

Figure 6:
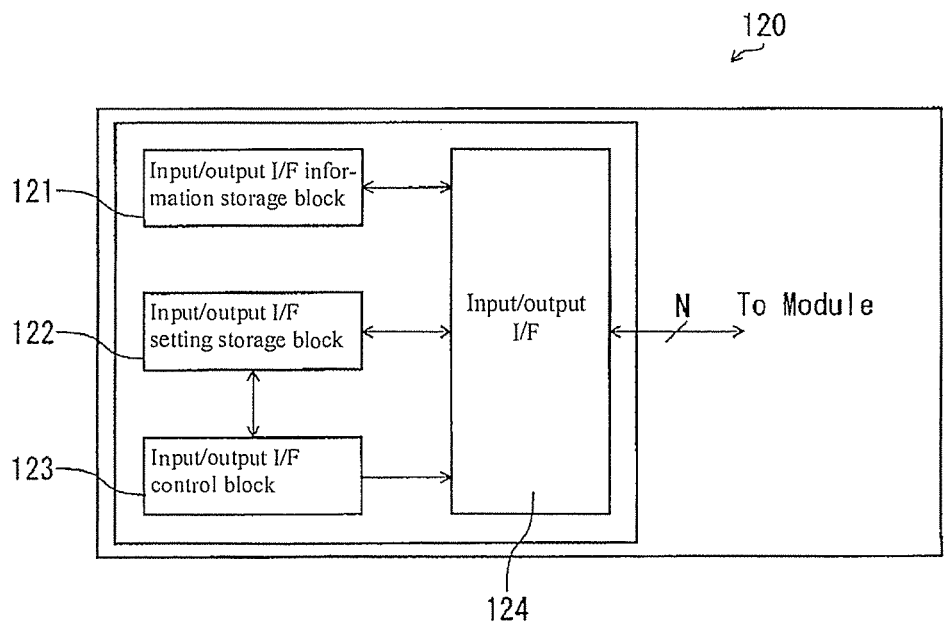
FIG. 6 is a block diagram showing the configuration of a host board to which the module according to the second embodiment of the present invention is mounted.

Now, in addition to the usual configuration, the host 120 is provided with an input/output I/F information storage block 121, an input/output I/F setting storage block 122, and an input/output I/F control block 123, as shown in FIG. 6.

Furthermore, the host 120 is provided with an input/output I/F 124 for carrying out the input/output operation with the module 110. The input/output I/F 124 consists of pins whose number is specified by the standards. In the present embodiment, it consists of 20 pins (see FIG. 11) that are adapted to the specifications of the SFP transceiver. The input/output I/F 124 is configured so that it can at least exchange information with the input/output I/F 114 of the module 110 in FIG. 5 based on the request from the module 110 via an I2C interface specified in the SFP standards. Furthermore, the input/output I/F 124 is configured so that the necessary changes in the pin setting can be performed by the input/output I/F control block 123 which is described in detail below.

The input/output I/F information storage block 121 stores the input/output I/F information (e.g., the input/output (I/O) information of all input/output I/Fs, the logic level (e.g., LVTTL/CML), information regarding the functions of the pins (e.g., RESET), etc.) which can be set by the host 120. Concretely, according to the standards, the pin No. 7 is a terminal for inputting information regarding the transmission speed of the data. However, besides inputting information regarding the transmission speed of the data, the pin No. 7 may also input a reset signal, outputs an alarm for the current or the temperature of a light emitting component (laser, etc.), and stores information that allow a temperature control signal for changing the desired control temperature of the light emitting component, to be inputted. The input/output I/F information storage block 121 is configured so that it can perform transmission and reception of signals between the above block 121 itself and the input/output I/F 124. More in detail, the input/output I/F 124 is not connected to all the pins, but only to the terminals (e.g., in an I2C interface, only the pin No. 4 and the pin No. 5 (+GND pins)) that enable the exchange of information with the module 110. Thus, the transmission and reception of signals is performed. The input/output I/F information storage block 121 is, e.g., an EEPROM.

The input/output I/F information storage block 121 of the present embodiment possesses, within the information regarding settable input/output I/Fs, information regarding a normal input/output I/F and information regarding a plurality of settable non-standard input/output I/Fs, such as those for the above-mentioned current alarm and temperature alarm, etc.

The input/output I/F setting storage block 122 stores information regarding the setting of the input/output I/F of the host 120. The input/output I/F setting storage block 122 is configured so that it can perform the transmission and reception of signals between the block 122 itself and the input/output I/F 124. More in detail, the input/output I/F 124 is not connected to all the pins, but only to the terminals (e.g., in an I2C interface, only the pin No. 4 and the pin No. 5 (+GND pins)) that enable the exchange of information with the module 110. Thus, the transmission and reception of signals is performed. In this manner, the writing (e.g. writing for adapting to a non-standard input/output I/F) can be set in accordance with the request from the module 110 via input/output I/Fs 114 and 124. The input/output I/F setting storage block 122 is, e.g., an EEPROM.

When this write setting is finished, the change of the input/output I/F can also be completed.

The input/output I/F control block 123 is configured so that it can perform the transmission and reception of signals between the block 123 itself and the input/output I/F setting storage block 122, and it sets the input/output I/F 124 based on the information read from the input/output I/F setting storage block 122. As to the connection between this input/output I/F control block 123 and the input/output I/F 124, it is sufficient if only the pins for which the setting is changeable are connected by the control lines. The input/output I/F control block 123 is, e.g., a mechanical switch, and may also possess a function of switching electrically or through software. Concretely, according to the standards, the pin No. 7 is a terminal for outputting information regarding the transmission speed of the data. However, in case the pin No. 7 outputs information regarding the transmission speed of the data, causes a reset signal to be inputted, outputs an alarm for the current or the temperature of a light emitting component (laser, etc.), and stores information that allow a temperature control signal for changing the desired control temperature of the light emitting component to be inputted, it becomes possible for the pin No. 7 to change the input/output I/F through the input/output I/F control block 113 based on information regarding the determined input/output I/F.

Furthermore, the input/output I/F control block 123 has a structure corresponding to a normal I/F, and is set to communicate through the normal I/F when activated. In case the host 120 has been given a request for write setting for adapting to a non-standard input/output I/F from the module 110, the normal I/F is switched to the requested non-standard I/F.

Incidentally, in case the host 120 does not correspond to the non-standard input/output I/F, it remains set to the normal I/F.

The above-described module 110 and host 120 have outer shapes determined by the normal standards. These standards are determined, e.g., by the specifications of the SFP transceiver, and each of the module 110 and the host 120 is configured so that it is detachable with compatibility.

Furthermore, although the connection between the module 110 and the host 120 takes the form of being implemented as a connector, and the form of being mounted on the top of a substrate, etc., it is not limited to any of these connection forms, and is configured to have compatibility according to the standards.

Figure 7:
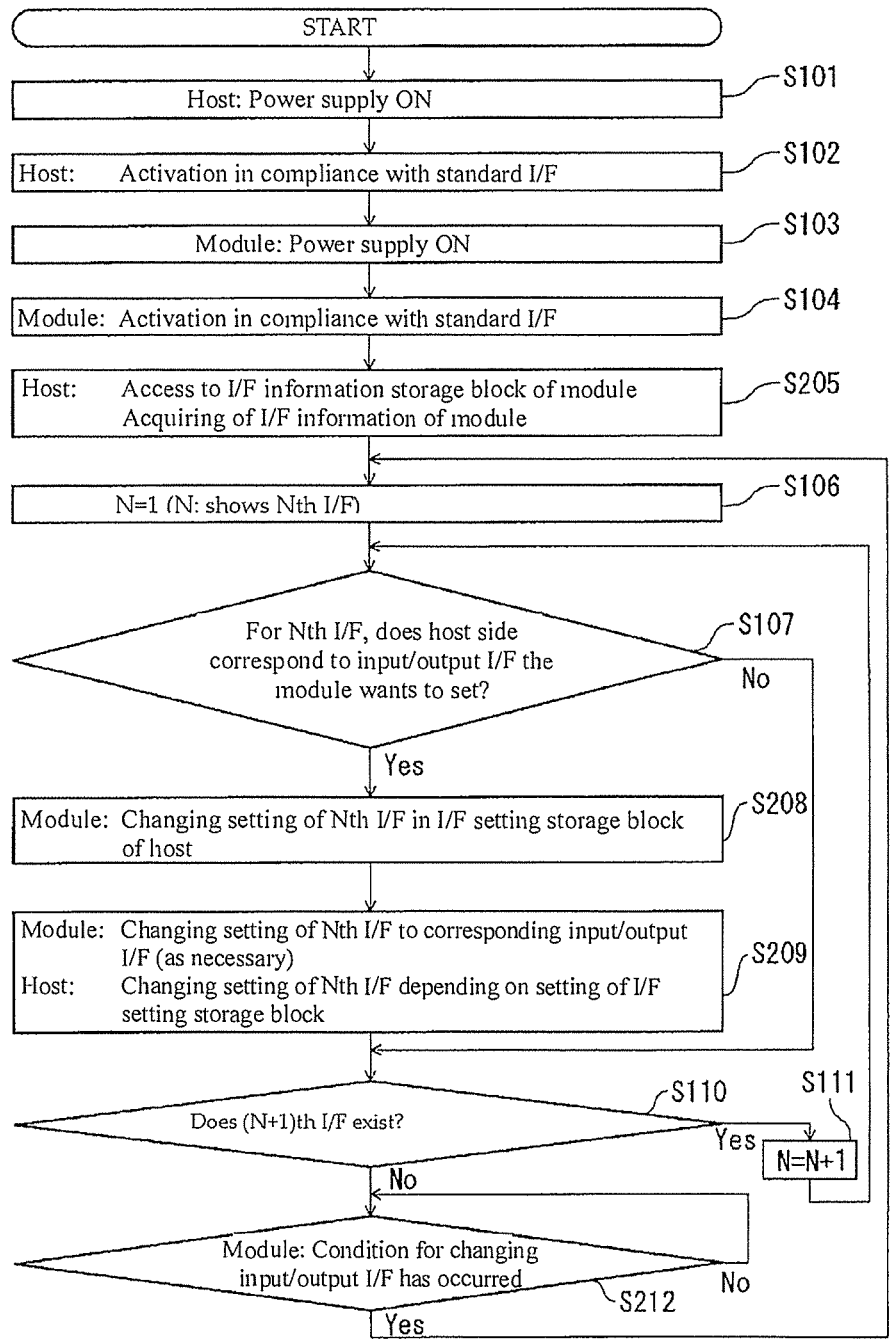
FIG. 7 is a flowchart showing the operation of the module and the host according to the second embodiment.

FIG. 7 is a flowchart showing the operation of the module 110 and the host 120. Incidentally, the steps which are identical to those in the first embodiment have the same reference numerals.

When electric power is fed to the host 120 (S101), the host 120 is activated in a condition where it is in compliance with the normal I/F (S102). Next, when electric power is fed to the module 110 (S103), the module 110 is also initially activated in a condition where it is in compliance with the normal I/F (S104). Because of this, the input/output I/Fs 114, 124 of the module 110 and the host 120 are initially set to the normal input/output I/F stored as an initial condition in the input/output I/F setting storage blocks 112, 122, and communicate with each other based on the I2C interface. So far, the steps have been the same as those of the first embodiment.

Now, the above-mentioned "compliance" means that, if they conform electrically, it is not absolutely necessary to implement a function of the standard I/F, and it is sufficient if, with the I2C communication standards, the host 120 can read the input/output I/F information of the module 110 and can perform minimum communication necessary for setting the module 110. Concretely, this means that the pin allocations indispensable for communication, such as power supply, communication signal, etc., conform to the I2C communication specifications, and that the other unused pins do not have to conform to them. Incidentally, although in the present embodiment, the exchange of input/output I/F information is performed using an I2C interface, it is not limited to the I2C interface. As long as the interface enables the exchange of input/output I/F information, any kind of interface is applicable.

Next, the input/output I/F information storage part 111A of the module 110 accesses the input/output I/F information storage block 121 of the host 120 and acquires I/F information of the host 120 (S205). This I/F information includes I/F information corresponding to each pin, information about whether or not the host 120 implements another non-standard I/F other than the normal I/F.

Subsequently, the host access block 111 of the module 110 counts the information of the I/F for the 1st to Nth (in the present embodiment, N is 1 to 20) pin out of the plurality of pins in order to check and scan them (S106). First, for the I/F of the first pin, the input/output I/F information comparison and judgment part 111C of the module 110 judges whether the host 120 corresponds to the input/output I/F the module 110 wants to set (S207). For example, if the I/F of the Nth pin corresponds to the I/F the module 110 wants to set, the input/output I/F setting storage part 111B of the module 110 writes this I/F for the Nth pin into the input/output I/F setting storage block 122 of the host 120, and changes the setting (S208).

Then, the input/output I/F control block 113 of the module 110 changes the I/F setting for the input/output I/F 114 as necessary, while the input/output I/F control block 123 of the host 120 changes the setting of the I/F of the Nth pin for the input/output I/F 124 (S209). On the other hand, if the I/F in step 107 is not the I/F the module 110 wants to set, the steps 208, 209 are not carried out.

Then, it is judged whether or not there is a (N+1)th pin (S110), and if such a pin exists, 1 is added to N (S111) and the operation returns to the step 107 and is executed again. If there is no (N+1)th pin, the change of the I/F to the Nth input/output I/F becomes final. In this manner, based on the acquired input/output I/F information, the mutually corresponding input/output I/Fs of the host 120 side and the module 110 are checked and the optimum input/output I/F is set for each I/F as necessary. For example, in case the host 120 and the module 110 correspond to the same non-standard input/output I/F, it is possible to set them to the non-standard input/output I/F.

Then, the input/output I/F control block 113 of the module 110 judges whether or not a condition has emerged where the input/output I/F should be changed (S212), and, if such a condition has not emerged, it executes the step 212 until it is confirmed that such a condition has emerged.

The judgment regarding whether or not said condition has emerged may be carried out intermittently as necessary. In other words, one communication and another communication do not need to be carried out by the same input/output I/F. Rather, the optimum input/output I/F may be selected for each communication, and the input/output I/F may be changed intermittently.

Furthermore, in case the pins up to the Nth pin are judged and the I/F the module 110 wants to set is not found, or in case there is no adaptable I/F, the module 110 and the host 120 transmit and receive signals through the initial normal I/F. Alternatively, in case no I/F desired to be set is found, it is possible to refrain from carrying out communication. Thus, the problems (damages, etc. due to short circuit or excess voltage) stemming from the differences between the input/output I/Fs are prevented from occurring.

The optical communication module 110 according to the second embodiment of the present invention comprises an input/output I/F information storage block 112 that stores input/output I/F information, an input/output I/F information comparison and judgment part 111C that compares the input/output I/F information obtained from the host 120 with the input/output information of the input/output I/F information storage block 112 and judges whether they coincide or not, and an input/output I/F setting storage part 111E for transmitting the coinciding input/output I/F to the host 120 side based on the judgment made by the input/output I/F information comparison and judgment part 111C. Thus, it is possible to flexibly adapt the input/output I/F of the host 120 to the module 110. Therefore, no electrical damage is caused to a module 110 that is in compliance with the existing normal standards.

Furthermore, since the module 110 and the host 120 have outer shapes formed based on the normal standards, the cost advantages achieved by using an existing product platform (cost saving, etc. achieved by communizing peripheral devices to obtain the mass-production effect.) are not lost.

Moreover, in case an I/F newer than the existing I/F is introduced, the invention can be adapted flexibly to this new I/F. Therefore, it becomes possible to reduce electric power consumption by inserting an I/F with excellent power consumption as the new I/F. Furthermore, it is possible to lower power consumption by changing the input/output I/F by e.g. setting unused input/output I/Fs to OPEN.

Since the optical communication system is configured so that, upon turning on the power supply or upon initialization, the input/output I/F between the host 120 and the module 110 is activated with the normal communication interface. Therefore, the I/F information can be exchanged under the initial condition through said normal communication interface.

The second embodiment of the present invention has been described so far. However, this invention is not limited to the above embodiment. Based on the technical idea of the present invention, various kinds of variations and modifications are possible.

For example, in the operation of the present embodiment, the input/output I/F setting changes are performed after the 1st to the Nth I/Fs for all the I/Fs have been checked one after another. Meanwhile, it is also possible to selectively check specific input/output I/Fs individually and then change the input/output I/F setting.

Furthermore, in an SFP transceiver, it is possible to exchange information of the product type name originally owned by the host by using an I2C interface or the like (or by sending product information of the host 120 by using one of the 20 pins). Therefore, the input/output I/F may be specified by using the information of the product type name originally owned y the host as information at the time of the comparison and judgment of the input/output I/F, and the setting of the input/output I/F can be changed. In such a case, the input/output I/F information storage block 121 of the host 120 shown in FIG. 6 is rendered unnecessary.

Figure 8:
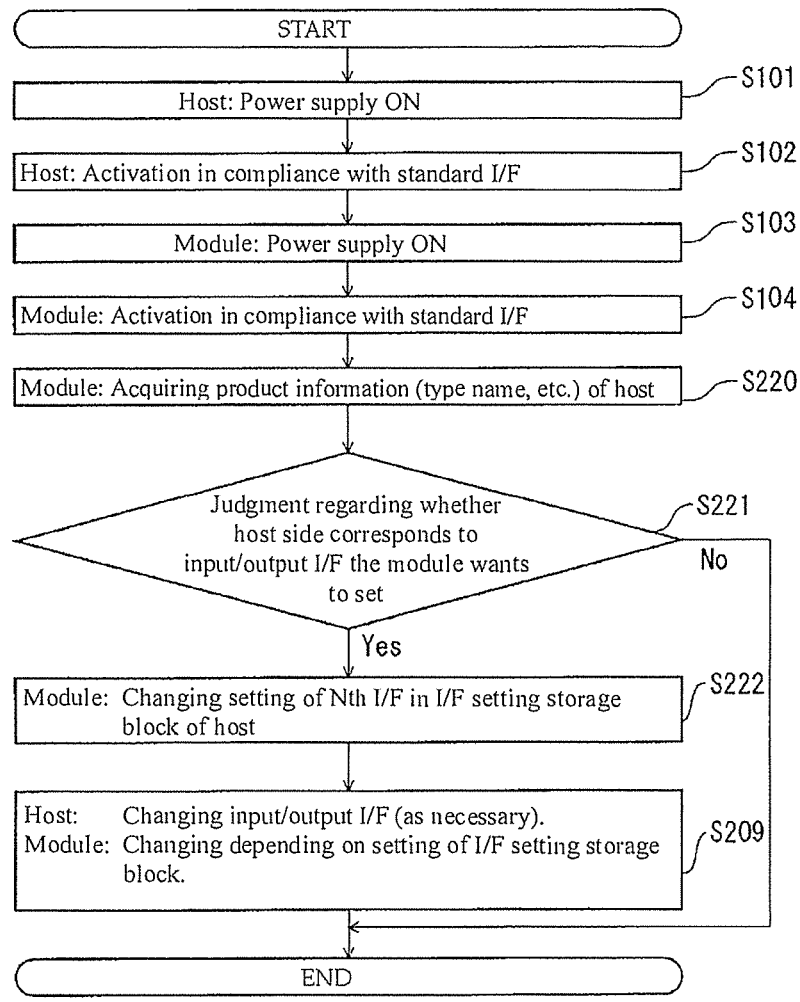
FIG. 8 is a flowchart showing a variation of the second embodiment.

The operation at this time is shown in the flowchart of FIG. 8.

In case the operation is performed according to this variation, first, the steps 101 to 104 are performed in the same manner as in the first embodiment, and the module 110 and the host 120 are able to transmit and receive signals via the normal I/F.

Next, the input/output I/F information storage part 111A of the module 110 acquires from the host 120 side any obtainable product information of the host 120 by transmission and reception through the normal I/F (S220). Then, the input/output I/F information comparison and judgment part 111C of the module 110 judges whether or not the host 120 corresponds to the input/output I/F the module 110 wants to set (S221). In case they correspond, the input/output I/F setting storage part 111B of the module 110 writes the input/output I/F into the input/output I/F setting storage block 122 of the host 120, and changes the setting (S222). Then, the input/output I/F control block 123 of the host 120 and the input/output I/F control block 113 of the module 110 change the respective input/output I/F 114, 124, in the same manner as in the operation of the second embodiment, in accordance with the corresponding I/F (S209).

Furthermore, in case it is judged in the step 221 that there is no corresponding I/F, the step 222 and the step 209 are not performed, and the module 110 and the host 120 transmit and receive signals via the initial normal I/F. Alternatively, it is also possible to refrain from communicating in case no I/F desired to be set is found.

On the other hand, in a certain case, the input/output I/Fs of the module 110 and the host 120 each correspond to multiple types of input/output I/Fs. In such a case, the optimum input/output I/F may be selected among them. Here, an input/output I/F with a plurality of functions may be implemented in a single input/output I/F, or a plurality of input/output I/Fs may be implemented for the same function. Furthermore, both of these cases can be realized at the same time. In case a plurality of input/output I/Fs is implemented for the same function, it is conceivable that, e.g., only if both the host 120 and the module 110 correspond to each other, switching to a low-energy consumption input/output I/F takes place in accordance with the normal standards.

Moreover, the operation procedure shown in FIG. 7 may also be performed multiple times depending on the operational status of the host 120 and the module 110. Since at this time, the information exchange of the steps 101 to 205 has already been performed, these steps may be omitted in the second and the subsequent performances of the multiple-time performances as necessary. Thus, the time of the communication processing can be shortened.

Third Embodiment

Hereinafter, an optical communication module according to the third embodiment of the present invention is described by referring to FIGS. 9 and 10.

The third embodiment makes use of a host 420 that possesses the functions of the host 20 of the first embodiment, and a module 410 that possesses the functions of the module 110 of the second embodiment, and these can be applied to an adaptable I/F in both directions. In other words, information of the host 420 is read from the module 410, and the host 420 can be adjusted to an I/F to which the module 410 can be adapted; and information of the module 410 are read from the host 420, and the module 410 can be applied to an I/F to which the host 410 can be adapted.

Figure 9:
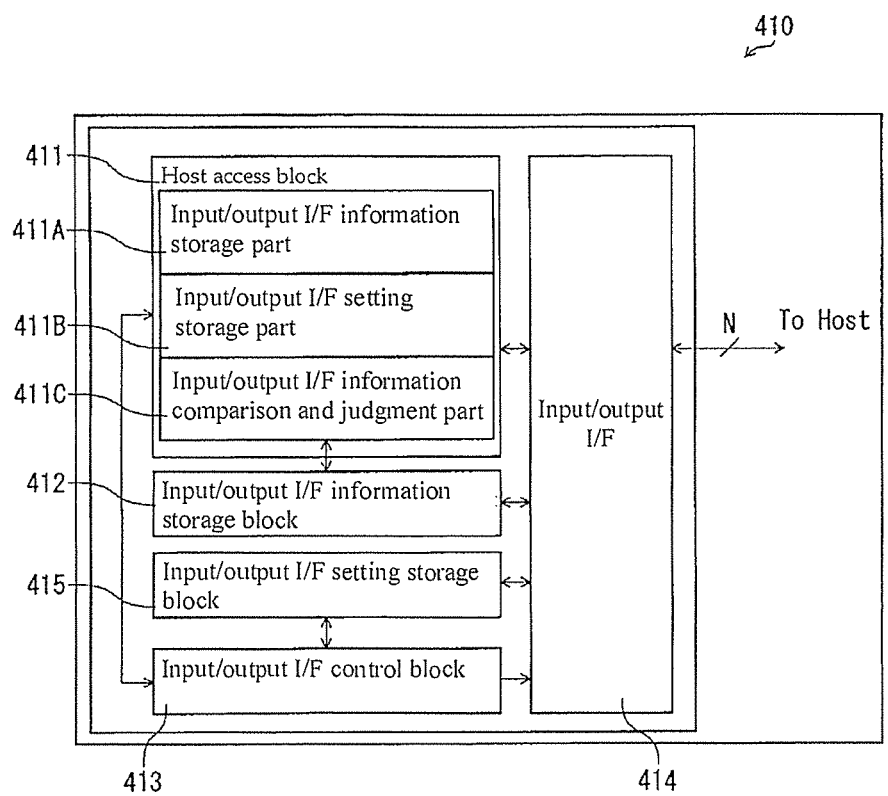
FIG. 9 is a block diagram showing the configuration of a module according to a third embodiment of the present invention.

FIG. 9 is a block diagram showing the configuration of the module 410 used in the present invention. FIG. 10 is a block diagram showing the configuration of the host 420.

In addition to the usual configuration, the module 410 is provided with a host access block 411, an input/output I/F information storage block 412, and an input/output I/F control block 413, as shown in FIG. 9. Furthermore, the module 410 is provided with an input/output I/F 414 for carrying out the input/output operation with the host board (circuit board, etc.; hereinafter referred to as host 420) to which the SFP optical transceiver is mounted.

The host access block 411 consists of an input/output I/F information storage part 411A, an input/output I/F setting storage part 411B, and an input/output I/F information comparison and judgment part 411C. Furthermore, the host access block 411 is configured so that it can perform the transmission and reception of signals between the block 411 itself and the input/output I/F 414. More in detail, the input/output I/F 414 is not connected to all the pins, but only to the terminals (e.g., in an I2C interface, only the pin No. 4 and the pin No. 5 (+GND pins)) that enable the exchange of information with the module 410. Thus, the transmission and reception of signals is performed.

The above-mentioned blocks 411, 412, 413, 414 perform and have the same operations and functions as the module 110 described in the second embodiment.

Also, in case the host 420 is not adapted to the non-standard input/output I/F, the normal I/F setting remains as it is.

On the other hand, unlike the module 110 in FIG. 5, the module 410 is provided with an input/output I/F setting storage block 415. The input/output I/F setting storage block 415 is configured so that it can perform transmission and reception of signals can be performed between the input/output I/F control block 413 and the input/output I/F 414. The input/output I/F setting storage block 415 communicates with the below-mentioned input/output I/F setting storage block 425 of the host 420 via the input/output I/F 414, and possesses a function of performing adjustment so that the controls in both the module 410 the host 420 side do not overlap.

Figure 10:
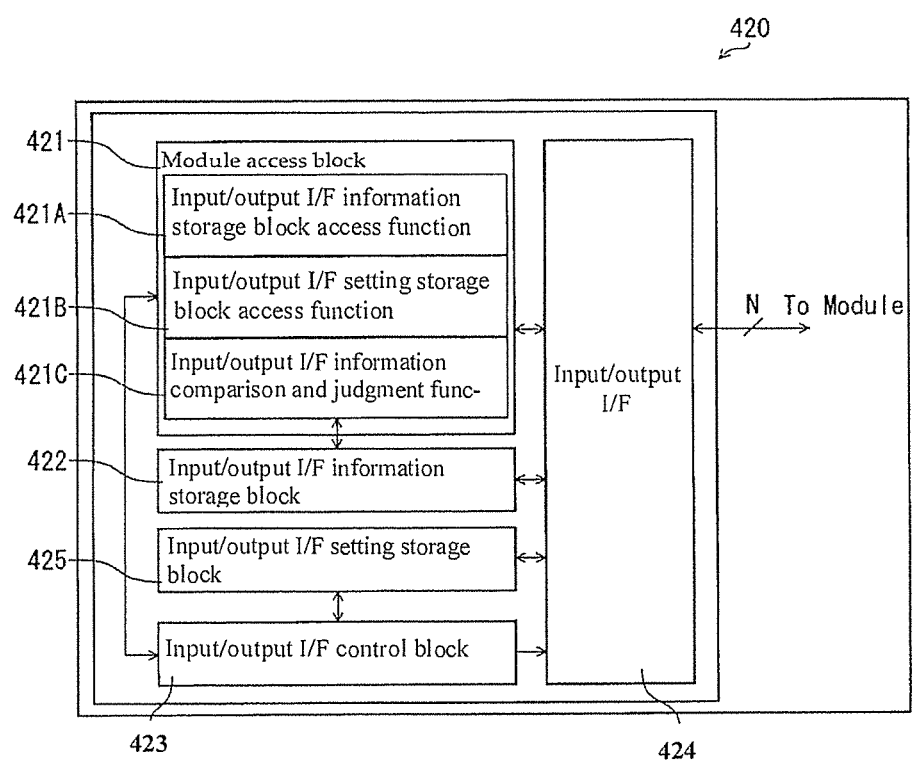
FIG. 10 is a block diagram showing the configuration of a host board to which the module according to the third embodiment of the present invention is mounted.

On the other hand, in addition to the usual configuration, the host 420 is provided with a module access block 421, an input/output I/F information storage block 422, and an input/output I/F control block 423, as shown in FIG. 10. Furthermore, the host 420 is provided with an input/output I/F 424 for carrying out the input/output operation with the module 410.

The module access block 421 consists of an input/output I/F information storage part 421A, an input/output I/F setting storage part 421B, and an input/output I/F information comparison and judgment part 421C. Furthermore, the module access block 421 is configured so that it can perform the transmission and reception of signals between the block 421 itself and the input/output I/F 424. More in detail, the input/output I/F 424 is not connected to all the pins, but only to the terminals (e.g., in an I2C interface, only the pin No. 4 and the pin No. 5 (+GND pins)) that enable the exchange of information with the host 410. Thus, the transmission and reception of signals is performed.

The above-mentioned blocks 421, 422, 423, 424 perform and possess the same operations and functions as the host 20 described in the first embodiment.

Incidentally, in case the module 410 is not adapted to the non-standard input/output I/F, the normal I/F setting remains as it is.

On the other hand, unlike the host 20 in FIG. 2, the host 420 is provided with an input/output I/F setting storage block 425. The input/output I/F setting storage block 425 is configured so that mutual transmission and reception of signals between the input/output I/F control block 423 and the input/output I/F 424. The input/output I/F setting storage block 425 communicates with the input/output I/F setting storage block 415 of the module 410 via the input/output I/F 424, and possesses a function of performing adjustment so that the controls in both the host 420 and the module 410 side do not overlap.

In the case of such a configuration, after activation, the module 410 and the host 420 exchange input/output information implemented by the module 410 and the host 420 in each of the I/Fs. This exchange can be performed as follows. Namely, the input/output I/F information of the module 410 may be obtained from the host 420, or the input/output I/F information of the host 420 may be obtained from the module 410. Alternatively, both procedures can be carried out at the same time.

According to this configuration, each of the operations stated in the first embodiment and the second embodiment can be performed, and the same effect can be achieved. Furthermore, by combining both operations, e.g., by controlling them equally, the control load can be prevented from being concentrated on the module 410.

EXPLANATION OF REFERENCE NUMERALS

10 SFP optical transceiver (module)
11 input/output I/F information storage block
12 input/output I/F setting storage block
13 input/output I/F control block
14 input/output I/F
20 host board (host)
21 module access block
21A input/output I/F information storage part
21B input/output I/F setting storage part
21C input/output I/F information comparison and judgment part
22 input/output I/F information storage block
23 input/output I/F control block
24 input/output I/F
110 SFP optical transceiver (module)
111 host access block
111A input/output I/F information storage part
111B input/output I/F setting storage part
111C input/output I/F information comparison and judgment part
112 input/output I/F information storage block
113 input/output I/F control block
114 input/output I/F
120 host board (host)

121 input/output I/F information storage block
122 input/output I/F setting storage block
123 input/output I/F control block
124 input/output I/F
410 SFP optical transceiver (module)
411 host access block
411A input/output I/F information storage part
411B input/output I/F setting storage part
411C input/output I/F information comparison and judgment part
412 input/output I/F information storage block
413 input/output I/F control block
414 input/output I/F
415 input/output I/F setting storage block
420 host board (host)
421 module access block
421A input/output I/F information storage part
421B input/output I/F setting storage part
421C input/output I/F information comparison and judgment part
422 input/output I/F information storage block
423 input/output I/F control block
424 input/output I/F
425 input/output I/F setting storage block

What is claimed:

1. Optical communication module which has an outer shape formed based on normal standards and which is able to communicate with a host-side circuit board to which the optical communication module is fitted, via a predetermined communication interface, the optical communication module being capable of switching the communication interface to another communication interface by exchanging input/output I/F information with the circuit board and changing a setting of a function of an input/output I/F based on the input/output I/F information.

2. Optical communication module of claim 1, wherein, upon turning on a power supply or upon initialization, the input/output I/F between the optical communication module and the circuit board is activated with a predetermined communication interface.

3. Optical communication module according to claim 1, comprising
an input/output I/F information storage block that stores input/output I/F information and feeds the input/output I/F information to the circuit board and
an input/output I/F setting storage block that stores input/output I/F setting information which is determined based on information of the input/output I/F information storage block and transmitted from the circuit board.

4. Optical communication module according to claim 3, comprising
an input/output I/F control block that sets the input/output I/F for each terminal based on information of the input/output I/F setting storage block.

5. Optical communication module according to claim 1, wherein information about the product type name originally owned by the optical communication module is obtained from within product information contained in the information communicated between the optical communication module and the circuit board and the input/output I/F is thus specified.

6. Optical communication module according to claim 1, comprising
an input/output I/F information storage block that stores input/output I/F information;
an input/output I/F information comparison and judgment part that compares input/output I/F information obtained from the circuit board with input/output I/F information storage block input/output information of the input/output I/F information storage block, and judges whether or not they coincide; and
an input/output I/F setting storage part that transmits input/output I/F setting information to the circuit board based on the judgment by the input/output I/F information comparison and judgment part.

7. Optical communication module according to claim 1, comprising
an input/output I/F information storage block that stores input/output I/F information;
an input/output I/F information comparison and judgment part that compares input/output I/F information obtained from the circuit board with input/output I/F information storage block input/output information of the input/output I/F information storage block, and judges whether or not they coincide; and
an input/output I/F setting storage part that stores input/output I/F setting information, based on the judgment by the input/output I/F information comparison and judgment part.

8. Optical communication module according to claim 7, comprising
an input/output I/F control block that sets the input/output I/F for each terminal based on the information of the input/output I/F setting storage part.

9. Optical communication module of claim 1, wherein the changing of the setting of the function of the input/output I/F is performed by one of:
changing a function of a pin by changing pin allocation; and
changing a setting of electric characteristics with the function of the input/output I/F being the same.

10. Optical communication system comprising an optical communication module which has an outer shape formed based on normal standards, and a circuit board on the host side to which the optical communication module is fitted, said optical communication module and said circuit board being able to communicate via a predetermined communication interface,
the communication interface being capable of being switched to another communication interface by exchanging input/output I/F information between the circuit board and the optical communication module and changing a setting of a function of an input/output I/F based on the input/output I/F information.

11. Optical communication system of claim 10, wherein, upon turning on a power supply or upon initialization, the input/output I/F between the circuit board and the optical communication module is activated with a predetermined communication interface.

12. Optical communication system of claim 10, wherein at least one of the functions is implemented:
in the optical communication module, acquiring input/output I/F information of the circuit board from the optical communication module, or
in the circuit board acquiring input/output I/F information of the optical communication module from the circuit board.

13. Optical communication system of claim 10, wherein
in case one input/output I/F of the optical communication module or the circuit board corresponds to a plurality of input/output I/Fs, one input/output I/F out of the plurality of input/output I/Fs is selected and put into operation.

14. Optical communication system of claim 10, wherein
in case there is a plurality of coinciding input/output I/Fs, the input/output I/F can be intermittently switched.

15. Optical communication system of claim 10, wherein the changing of the setting of the function of the input/output I/F is performed by one of:
  changing a function of a pin by changing pin allocation; and
  changing a setting of electric characteristics with the function of the input/output I/F being the same.

* * * * *